Sept. 21, 1965 W. M. DOTTS, JR 3,207,684
METHOD FOR CHANGING THE DISTRIBUTION OF IONS
IN A SOLUTION OF AN ELECTROLYTE
Filed Dec. 17, 1964

Walter M. Dotts, Jr.
INVENTOR.

United States Patent Office 3,207,684
Patented Sept. 21, 1965

3,207,684
METHOD FOR CHANGING THE DISTRIBUTION
OF IONS IN A SOLUTION OF AN ELECTROLYTE
Walter M. Dotts, Jr., 2605 Monument Ave.,
Richmond, Va.
Filed Dec. 17, 1964, Ser. No. 419,017
7 Claims. (Cl. 204—180)

This is a continuation-in-part of application Serial No. 277,997 filed May 6, 1963.

This invention relates to a novel method for changing the distribution of ions in a solution of an electrolyte utilizing the interaction of an alternating magnetic field with ionic acceleration caused by the synchronous application of an alternating electric field.

There is a need for a new process offering greatly improved economy and simplicity of operation over existing methods for changing the distribution of dissolved salts, acids, and bases in solutions of electrolytes. Examples of the need for such a method comprise the following: (1) The preparation of fresh water from saline waters, which includes sea water, saline ground waters, and waste waters from commercial, industrial or residential activities. (2) The concentration of dissolved salts in industrial plant effluents and natural saline waters leading to economical recovery and re-use of valuable chemicals and minerals.

In particular, the problem of preparing fresh water from saline waters at very low cost, approaching the cost of impounding and transporting natural fresh water over moderate distances, is an increasingly important problem as population and industry continue to grow and the uncommitted supply of fresh water diminishes. Vast areas of the world could be opened for development by a really economical method for decreasing the concentration of dissolved salts in sea water in order to provide potable water and water for irrigation and industry.

For satisfactory use as potable water, for example, sea water which has about 35,000 parts per million of salt content, must have this concentration of dissolved salts reduced to about 500 or fewer parts per million (p.p.m.). Table I shows the salts found in sea water in the various oceans of the earth and gives their approximate concentrations

TABLE I

| Salt: | Concentration in p.p.m. |
|---|---|
| NaCl | 27,213 |
| MgCl$_2$ | 3,807 |
| MgSO$_4$ | 1,658 |
| CaSO$_4$ | 1,260 |
| K$_2$SO$_4$ | 863 |
| CaCO$_3$ | 123 |
| MgBr$_2$ | 76 |
| | 35,000 |

All of the salts listed in Table I dissociate to some degree in aqueous solution to form positive ions (cations) and negative ions (anions). The degree of such dissociation is high for all these salts excepting calcium carbonate (CaCO$_3$) and calcium sulphate (CaSO$_4$). In aqueous solution, a salt like CaCO$_3$ or CaSO$_4$ for which a solubility product can be calculated, exists in equilibrium with its ions. Thus, if the ions at equilibrium with the molecules in any given volume $dv_1$ of a solution are driven by an external force into another volume $dv_2$ of the solution, equilibrium conditions will be maintained by the formation of more ions in $dv_1$ and the recombination of some ions to form molecules in $dv_2$.

Therefore, any given volume $dv_1$ of a solution under treatment by the process of this invention will be supplied with ions from any slightly dissociated solutes dissolved in it until substantially all such solutes have been ionized and driven, as ions, into a neighboring volume $dv_2$. Examples of the manner in which such salts dissociate to form electrically charged ions are shown by the equations in Table II. Ions can bear single, double, triple, or higher charges.

TABLE II

NaCl → Na$^+$Cl$^-$ (highly dissociated)
MgCl$_2$ → Mg$^{++}$Cl$^-$Cl$^-$ (highly dissociated)
MgSO$_4$ → Mg$^{++}$SO$_4^{--}$ (highly dissociated)
K$_2$SO$_4$ → K$^+$K$^+$SO$_4^{--}$ (highly dissociated)
MgBr$_2$ → Mg$^{++}$Br$^-$Br$^-$ (highly dissociated)
CaSO$_4$ ⇌ Ca$^{++}$SO$_4^{--}$ (partially dissociated)
CaCO$_3$ ⇌ Ca$^{++}$CO$_3^{--}$ (slightly dissociated)

Among the conventional processes for preparing potable water from saline waters, only the electrodialysis method makes use of the charges appearing on the ions in solution as a means for segregating such ions from a portion of the water in which they are found. In the electrodialysis method for decreasing the concentration of salts in aqueous solution, the cost of electric energy consumed makes infeasible the economical application of electrodialysis to the desalinization of anything more concentrated than "brackish" or lightly saline waters. The other conventional processes, distillation and freezing, accomplish the separation of pure water from saline water by causing the water containing the dissolved salts to undergo a change of state, producing vapor or ice, respectively, thereby separating a purified portion of the water and leaving the solutes in concentrated solution in the remainder.

When the salts in sea water went into solution, a fixed amount of energy was released. Whichever method is used to separate the salt from the water must restore the energy liberated when the salt originally dissolved.

When dealing with sea water of average salinity, the minimum amount of energy necessary to separate 1,000 gallons of pure water from the dissolved salts is approximately 2.8 kilowatt hours. According to the "Standardized Procedure for Estimating Costs of Saline Water Conversion," published by the Office of Saline Water, U.S. Department of Commerce, for plants using less than 100,000 kilowatts, electric power costs should be computed at 7 mills per kilowatt (kw.) hour. Therefore, using the 7 mills per kw.-hour figure, the minimum energy cost involved in separating 1,000 gallons of pure water from sea water would be about two cents. This would be the energy cost for an ideal process and does not include any of the other costs necessarily involved.

For practical industrial plants employing the distillation process, it is considered good to attain a thermodynamic-cycle efficiency of about 20 percent. Such inescapable thermodynamic losses cause the wastage of large amounts of energy. In Scientific America, December 1962 issue, Fairbanks Whitney was reported to have stated that its present freezing process could produce fresh water from sea water by freezing at an energy cost of 40 kilowatt hours per 1,000 gallons. This figure is 14.3 times the minimum energy cost of 2.8 kilowatt hours discussed above. This present invention teaches a method for changing the distribution of ions in solutions of electrolytes, like sea water, in which the thermodynamic-cycle efficiency reaches very high percentages, thus reducing the direct energy costs of the process.

For the purpose of this application, a solution of an electrolyte is defined as any solution which conducts an electric current. The present method uses the charges appearing on the ions of dissolved substances as a means for segregating such ions from a portion of the water or other solvent in which they are dissolved. In this respect only is the present method at all similar to the electrodialysis method. In all other respects, the method of this invention differs markedly from conventional methods used to separate dissolved substances from solution.

The present inventor has discovered a novel method for causing the controlled migration of both positive and negative ions in solution in the same direction by combining the acceleration imparted to such ions by an alternating electric field with the concomitant acceleration imparted to such ions by a synchronously alternating magnetic field transverse in direction to said electric field. The combination of the two accelerations, produced by the synchronized electric and magnetic fields, gives a resultant acceleration to the ions in solution which tends to cause the movement of both positive and negative ions in the same direction. When the combined action of the synchronous electric and magnetic fields is applied, as taught by this invention, to a volume of a solution of an electrolyte, all of the cations and anions in the volume of treated solution are caused to migrate in the same direction and consequently, the changing distribution of ions in the solution produces a distribution curve corresponding to a gradation in concentration of electrolyte across the volume of solution under treatment. No membrane or other selective blocking agency need be interposed to aid in this segregation process. The method of this invention can be applied to solution flowing in a conduit near a junction where said conduit branches into two other conduits, so that solution containing a decreased concentration of ions issues from one of the branch conduits and solution containing an increased concentration of ions issues from the other branch conduit.

It is, therefore, a primary object of this invention to provide an improved method for changing the distribution of ions in a solution of an electrolyte.

Another principal object of this invention is to provide an improved method for the preparation of potable water from saline water, including sea water.

A secondary object of this invention is to provide an improved method for concentrating the ions of dissolved electrolytes leading to the recovery of valuable minerals and chemicals from industrial effluents or from saline waters.

The method of this invention will be apparent from consideration of the following description taken in conjunction with the accompanying drawing in which:

FIG. 1 is a schematic drawing illustrating the action of the first half of one cycle of an alternating electric field combined with and synchronized with the similar first half of one cycle of an alternating magnetic field upon a representative pair of ions comprising one singly charged cation and one singly charged anion, like the $Na^+$ and $Cl^-$ ions respectively of NaCl, the major constituent among the dissolved salts in sea water.

If an ion in a magnetic field is accelerated by a first force in a direction transverse to the magnetic field, there will exist a second force on the ion tending to accelerate the ion in a direction at right angles to both the magnetic field and to the said first force producing the original acceleration. The actual path followed by the ion will be the resultant of the said first and second forces acting on the ion.

Figure 1:
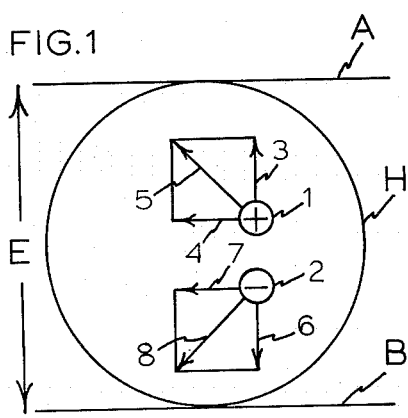

In FIG. 1, letter H denotes a magnetic field perpendicular to the page of the drawing and directed into the page during the half-cycle of alternating current which produces the conditions shown by FIG. 1. In this case, the north magnetic pole is above the page of the drawing, while the south magnetic pole is below the page. Magnetic field H may be provided by an electromagnet of any suitable type or by a solenoid having its axis perpendicular to and intersecting the plane of the page of the drawing.

Letters A and B designate a pair of electrodes which define an electric field E, transverse in direction to magnetic field H. During the half-cycle of alternating current which produces the conditions shown in FIG. 1, electrode A is negative while electrode B is positive. Reference numeral 1 designates a singly charged cation while numeral 2 designates a singly charged anion.

Essential to the practice of the method of this invention is that the fields H and E are to some degree transverse to one another and that cation 1 and anion 2 are located in space traversed by both field H and field E. Maximum efficiency in the process is achieved when fields H and E are at right angles to one another.

In operation, consider the forces acting on cation 1 during the time interval shown in FIG. 1. Vector 3 designates the force exerted upon cation 1 by electric field E which tends to accelerate cation 1 toward electrode A. Cation 1, due to its positive charge and its resulting acceleration toward instantaneously negative electrode A imparted by electric field E, behaves as though it were a part of a conductor carrying electric current toward electrode A. When a current carrying conductor is acted upon by a magnetic flux at right angles to the conductor, a force is exerted upon the conductor tending to accelerate the conductor in a direction at right angles to both the direction of current flow and to the direction of the magnetic flux. In this case, when the direction of current flow is toward electrode A, and the direction of magnetic flux is into the page of the drawing, the force acting on a hypothetical conductor would be in the direction of vector 4.

The present inventor has discovered that cation 1 is acted upon by a force designated by vector 4, which is exerted by magnetic field H and which tends to accelerate cation 1 in a direction at right angles to both electric field E and magnetic field H. Vector 5, the resultant of vectors 3 and 4, designates the actual path followed by cation 1 as a result of the synchronous combined action of fields E and H during the first half of one cycle of alternating current generating fields E and H.

Similarly, consider the forces acting on anion 2 during the time interval shown in FIG. 1. Vector 6 designates the force exerted upon anion 2 by electric field E which tends to accelerate anion 2 towards electrode B. Since we are still considering the same half-cycle of alternating current which produced the forces on cation 1 designated by vectors 3 and 4, the instantaneous direction of current flow in the solution of electrolyte containing cation 1 and anion 2 is unchanged. Thus, the current flow is still toward electrode A (from positive to negative electrode according to electrical engineering convention) and the direction of magnetic flux is still into the page of the drawing. Therefore, the force acting on a hypothetical conductor, containing anion 2, would still be in the same direction as vector 4. Even though anion 2 is being instantaneously accelerated toward electrode B, since this is a negative ion moving in a direction opposite to that of cation 1, we can construe both cation 1 and anion 2 to be parts of the same hypothetical conductor instantaneously carrying electric current toward electrode A.

Thus, the forces exerted by magnetic field H upon all parts of the same hypothetical conductor instantaneously carrying current in a single direction, will tend to accelerate all parts of said conductor in the same direction.

The present inventor has discovered that anion 2 is acted upon by a force, designated by vector 7, which is exerted by magnetic field H, and which tends to accelerate anion 2 in the same direction in which vector 4 tends to accelerate cation 1. Vector 8, the resultant of vectors 6 and 7, designates the actual path followed by anion 2 as a result of the synchronous combined action of fields E and H during the first half of one cycle of alternating current generating fields E and H.

Figure 2:
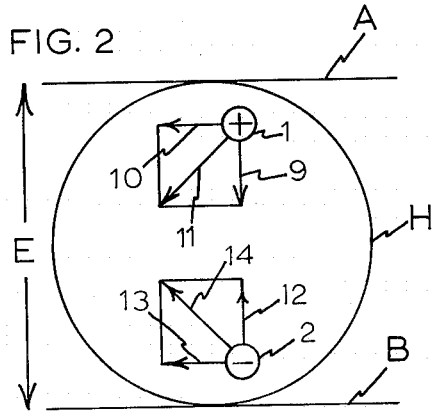
FIG. 2 is a schematic drawing illustrating the action of the second half of one cycle of an alternating electric field combined with and synchronized with the similar second half of one cycle of an alternating magnetic field upon the same representative pair of singly charged ions depicted in FIG. 1.

Turning now to FIG. 2, we are dealing with the conditions produced by the second half of one cycle of alternating current generating fields E and H. In this case, the instantaneous current flow in the solution of electrolyte containing cation 1 and anion 2 is in the direction opposite to its direction in FIG. 1. During the time interval of FIG. 2, electrode A is positive and electrode B is negative since the direction of electric field E is reversed with the direction of instantaneous current flow being toward electrode B. Synchronously, the direction of magnetic field H has reversed and is now out of the page of the drawing.

In operation consider the forces acting on cation 1 during the time interval shown in FIG. 2. Vector 9 designates the force exerted upon cation 1 by electric field E which tends to accelerate cation 1 toward electrode B. Cation 1, due to its positive charge and its resulting acceleration toward instantaneously negative electrode B imparted by reversed electric field E, behaves as though it were a part of a conductor carrying electric current toward electrode B. In this case, when the direction of magnetic flux is reversed and is out of the page of the drawing, the force acting on a hypothetical conductor would be in the direction of vector 10.

The present inventor has discovered that cation 1 is acted upon by a force, designated by vector 10, which is exerted by magnetic field H, and which tends to accelerate cation 1 in a direction at right angles to both fields, E and H. Since the second half-cycle of alternating current which produces the conditions shown in FIG. 2 has reversed the direction of both fields, E and H, the vector 10 points in the same direction as vector 4 in FIG. 1. Vector 11, the resultant of vectors 9 and 10, designates the actual path followed by cation 1 as a result of the synchronous combined action of fields E and H during the second half of one cycle of the alternating current generating fields E and H.

Similarly, consider the forces acting on anion 2 during the time interval shown in FIG. 2. Vector 12 designates the force exerted upon anion 2 by reversed electric field E which tends to accelerate anion 2 toward electrode A which is now instantaneously positive. Since we are now considering the same second half-cycle of alternating current which produced the forces on cation 1, designated by vectors 9 and 10, the instantaneous direction of current flow in the solution of electrolyte containing cation 1 and anion 2 is still toward electrode B and anion 2 can be construed to be a part of the same hypothetical conductor containing cation 1. The magnetic flux, now directed out of the page of the drawing, exerts a force on the hypothetical conductor in the direction of vector 13.

The present inventor has discovered that anion 2 is acted upon by a force, designated by vector 13, which is exerted by magnetic field H, and which tends to accelerate anion 2 in the same direction as cation 1 during this second half-cycle of the alternating current generating fields E and H. Vector 14, the resultant of vectors 12 and 13, designates the actual path followed by anion 2 as a result of the synchronous combined action of fields E and H during the second half of one cycle of the alternating current generating fields E and H. The direction of vector 13, like the direction of vector 10, is the same as the direction of vectors 4 and 7 which designate, respectively, the forces acting on cation 1 and anion 2 during the first half-cycle of the alternating current generating fields E and H.

Figure 3:
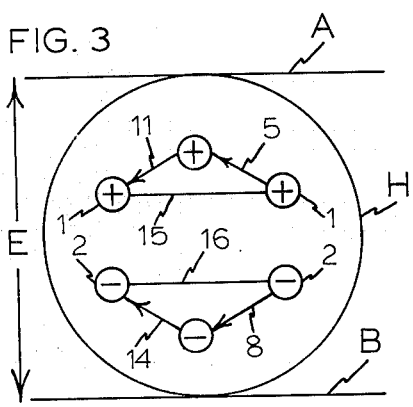
FIG. 3 is a schematic drawing illustrating how the combined action of the synchronous electric and magnetic fields during one full cycle of the alternating current used to generate such fields, causes a resultant translatory movement of both a cation and an anion in the same direction at right angles to both the electric and the magnetic fields.

Now, turning to FIG. 3, which shows the effects upon the ions of a complete cycle of the alternating current generating fields E and H, vectors 5 and 11 designate the paths followed by cation 1 during the two time intervals corresponding, respectively, to the first and second halves of the said cycle of alternating current. Line segment 15 designates the net translatory movement of cation 1 during the said complete cycle comprising the said two time intervals. Similarly, vectors 8 and 14 designate the paths followed by anion 2 during the said two time intervals during which the directions of fields E and H change synchronously. Line segment 16 designates the net translatory movement of anion 2 during the said complete cycle of two time intervals. Line segments 15 and 16 point in the same direction. Thus, the continued application of the synchronously alternating transverse fields E and H succeeds in causing the migration, in the same direction of both cations and anions in a solution of an electrolyte. This migration results in a distribution curve representing a gradation in concentration of ions across the volume of solution subjected to the synchronous application of crossed electric and magnetic fields.

Ions carrying double, triple, or higher charges will behave in a manner similar to that discussed for the singly charged ions except that the velocity of migration will be proportional to the magnitude of the charge on an ion. The actual configurations, frequencies, and magnitudes of fields E and H can be set to provide ion migration at varying rates and in conformity with the geometry of the container used and the method adopted for separating by flow pattern or otherwise the portions of solution representing opposite ends of the distribution curve discussed above.

Figure 4:
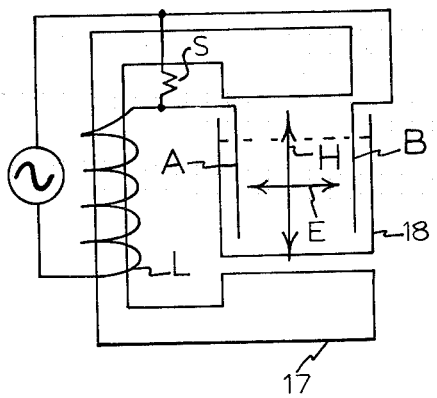
FIG. 4 is a schematic drawing illustrating one form of electric circuit suitable to the practice of this invention.

Turning now to FIG. 4, there is shown a simple series circuit by means of which the method of this invention may be practiced. The magnetic flux in field H will be at a peak in either direction shown by the arrows H when the current is at a maximum in the inductance L which activates the electromagnet 17. Since the current is everywhere the same at any instant in a series circuit, the instant the current is at a maximum in inductance L, it will also be at the maximum across the resistance between electrodes A and B in container 18. Thus, at said instant, electric field E will also be at a maximum since the potential difference between electrodes A and B is a product of the instantaneous current times the resistance of the solution between them. Shunt S is a low resistance connected in parallel with electric field E across the solution of electrolyte. Shunt S diverts a portion of the current flowing in the winding of the electromagnet around the solution of electrolyte so that the desired current density can be maintained in the electrolyte. Therefore, since the current flowing in inductance L and between electrodes A and B will reverse sychronously, fields H and E will always change direction synchronously in keeping with the method of this invention.

Figure 5:
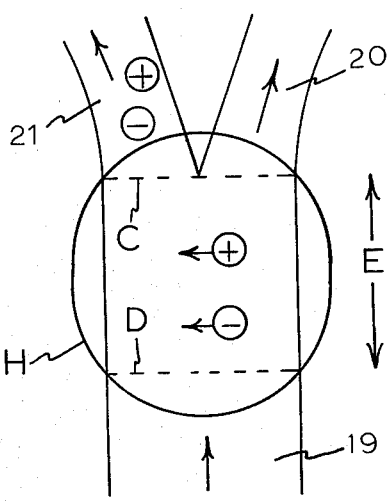
FIG. 5 is a schematic drawing illustrating one way the method of this invention may be employed to divide a stream of a solution of an electrolyte into a portion containing a decreased concentration of ions and a portion containing an increased concentration of ions.

Turning now to FIG. 5, there is shown a schematic of a simple flow system by means of which a stream 19 of a solution of an electrolyte can be divided to form a first stream 20 containing a decreased concentration of ions and a second stream 21 containing an increased concentration of ions. In FIG. 5, stream 19 flows through transverse, intersecting, synchronously alternating electric and magnetic fields E and H where field E is maintained between screen electrodes C and D which are interposed at right angles to the direction of flow of stream 19, and field H is perpendicular to the page of the drawing. For purposes of illustration, assume that fields E and H are synchronized with the relative polarities given in FIG. 1 and FIG. 2. Thus ion migration will be to the left in the drawing as shown. When stream 19 divides, stream 20 will contain a decreased concentration of ions and stream 21 will contain an increased concentration of ions. The output streams 20 and 21 may be given a plurality of treatments similar to that of FIG. 5 in cascade.

In order that those skilled in the art may more fully appreciate the nature of my invention and the method of carrying it out, the following examples are given:

A glass treatment cell of rectangular cross-section was placed between the pole pieces of an electromagnet. The dimensions of the portion of the cell employed for treatment were 3.80 cm. × 1.25 cm. × 5.20 cm. (L × W × H, respectively). The cross-sectional area of the cell in a vertical plane perpendicular to the flux path of the magnetic field between the pole pieces was 1.25 cm. × 5.20 cm. = 6.50 sq. cm.

Platinum electrodes were inserted vertically at opposite ends of the cell across its length. These electrodes were 18 gauge wire and the immersed portion of each electrode was 5.20 cm. long. The interelectrode distance was 3.6 cm. The electric field between these two electrodes was horizontal and was perpendicular to the horizontal flux path between the electromagnet's pole pieces.

The electromagnet's pole gap was 1.7 cm. and the area of each rectangular pole was 26.5 sq. cm., being slightly larger than the area of one side of the portion of the cell employed for treatment. The pole pieces and the yoke of the electromagnet were soft iron. The average cross-sectional area of the iron circuit was 20 sq. cm. and the length of this circuit was 82 cm. The electromagnet's winding was 600 turns. The energizing current was 60 amperes R.M.S. alternating at 60 cycles per second (c.p.s.) The magnetmotive force was 45,400 Gilberts, which produced a field intensity (H) of 540 oersteds and a flux density (B) of 10.3 kilogausses (kg.) per sq. cm. in the space between the pole pieces occupied by the glass treatment cell. Even though the pole pieces and the yoke of the electromagnet were segmented, insulated from one another, and bolted together, the alternating flux developed some eddy currents in the iron. Cooling was provided by immersing the entire electromagnet in a cooling bath and by pumping the coolant around the thin-walled glass treatment cell in order to keep the solutions of electrolytes at or near their freezing points during treatment.

Saline water having a sodium chloride concentration of 3.5% was introduced into the right-hand side of the treatment cell and was withdrawn from two points on the left-hand side of the cell. The two withdrawal locations for the effluent solution were (a) at the surface of the solution in the cell and (b) at the bottom of the cell. Both locations (a) and (b) were on the same vertical line adjacent to the cell wall at the extreme left-hand side of the cell. The input solution entered at mid-depth adjacent to the extreme right-hand side of the cell. Thus, the flow was across the length of the cell from the right-hand electrode toward the left-hand electrode, and this flow was perpendicular to the flux path of the magnetic field.

*Example I*

The input stream was 3.5% sodium chloride aqueous solution. The interelectrode potential was 12.5 volts R.M.S. The current flow was 1.00 ampere at 60 c.p.s. taken from across a portion of the electromagnet's winding circuit. The current density in the treatment cell was 0.154 amp. per sq. cm. The flux density was 10.3 kg. at 60 c.p.s. The solution flow rate was 0.2 milliliter (ml.) per minute. Conductivity tests made on the effluent solution withdrawn from locations (a) and (b) after 10 minutes of treatment according to the method of this invention showed an average 4.6 percent higher conductivity for effluent from location (b) as compared with effluent from location (a) after all samples were brought to room temperature (22.5° C.). Ion migration from the top toward the bottom of the cell was established by these tests. The treatment cell was loosely packed with spun glass in an effort to mitigate the mixing effects due to convection currents set up by uneven resistance heating of the solution in the cell. Treatment was carried out at atmospheric pressure.

*Example II*

The input stream was 3.5% sodium chloride aqueous solution. The interelectrode potential was 13.6 volts R.M.S. The current flow was 1.10 ampere at 60 c.p.s. taken from across a portion of the electromagnet's winding circuit. The current density in the treatment cell was 0.169 amp. per sq. cm. The flux density was 10.3 kg. at 60 c.p.s. The solution flow rate was 0.3 ml. per minute. Conductivity tests made on the effluent solution withdrawn from locations (a) and (b) after 10 minutes of treatment according to the method of this invention showed an average 5.1 percent higher conductivity for effluent from location (b) as compared with effluent from location (a) after all samples were brought to room temperature (23.0° C.) Ion migration was from the free surface of the solution in the cell toward the bottom of the cell. The cell was loosely packed with spun glass. The treatment was carried out at atmospheric pressure.

In another experiment, the positions of the electrodes was changed to test the operation of the process under conditions different from those given above.

The same glass treatment cell and the same electromagnet with the same pole gap and flux density discussed above were used.

Two eighteen gauge platinum wire electrodes were placed horizontally across the length of the treatment cell at the bottom and at the top of the treatment zone between the electromagnet's pole pieces. The interelectrode distance was 5.2 cm. The electric field between these two electrodes was vertical and was perpendicular to the horizontal flux path between the electromagnet's pole pieces. As before, the flux density (B) in the electromagnet's pole gap was 10.3 kg. per sq. cm. alternating synchronously at 60 c.p.s. with the transverse 60 c.p.s. electric field established in the electrolyte.

Cupric sulphate solution 0.5 normal (the approximate electrochemical equivalent of sea water) was introduced at the center of the top of the treatment zone between the pole pieces of the electromagnet and was withdrawn frrom the extreme left-hand and right-hand sides at the bottom of the cell. Thus, the flow was from the top toward the bottom of the treatment zone perpendicular to the horizontal flux path of the alternating magnetic field.

*Example III*

The input solution was 0.5 normal cupric sulphate aqueous solution. The current flow in the electrolyte was 1.00 ampere at 60 c.p.s. taken from across a portion of the electromagnet's winding circuit. The cross-sectional area of the cell perpendicular to the electric field (L × W) was 3.80 cm. × 1.25 cm. = 4.75 sq. cm. The current density in the treatment cell was 0.211 amp. per sq. cm. and the current path was perpendicular to the flux path of density 10.3 kg. per sq. cm. The solution was treated for 15 minutes after which two 1.5 ml. samples were withdrawn from the bottom of the treatment cell, one from the extreme left-hand and one from the extreme right-hand side. Conductometric analysis of these samples after both had been reduced to room temperature (23.0° C.) showed a 10.0 percent higher conductivity for the sample taken from the right-hand bottom of the cell as compared with the solution taken from the left-hand bottom of the cell.

Ion migration from the left-hand side toward the right-hand side of the treatment cell was established by this test. This direction of ion migration corresponded to the direction established by the experiments reported in Examples I and II since the circuit connections to the platinum wire electrodes from the same positions across the electromagnet's winding circuit were similar in each case. Thus, the left and right vertical electrodes in Examples I and II correspond respectively to the bottom and top horizontal electrodes in Example III . While ion migration was toward the bottom of the treatment cell with left and right vertical electrodes, the act of swinging these electrodes counterclockwise ninety degrees so that the left hand electrode became the bottom electrode and the right-hand electrode became the top electrode, caused ion migration to proceed from left to right as reported in Example III instead of from top to bottom as reported in Examples I and II.

The essential combination of the synchronously alternating transversally oriented electric and magnetic fields is the essence of this invention, and this combination may be provided by means other than those described in the preferred embodiment and still lie within the scope of this invention.

What I claim is:

1. The method for changing the distribution of ions in a solution of an electrolyte which comprises subjecting said solution to an alternating magnetic field, concomitantly subjecting said solution to an alternating electric field applied in a direction substantially transverse to and intersecting said magnetic field, and synchronizing the alternations of said fields to cause their directions relative to one another to maintain a substantially constant relationship, and recovering a portion of said solution having a changed concentration of ions.

2. In a process for changing the distribution of ions in a solution of an electrolyte, the steps of passing a magnetic field through said solution, passing an electric field through said solution in a direction substantially transverse to and intersecting said magnetic field, alternating the direction of magnetic flux in said magnetic field, alternating the polarity of said electric field in step with the alternations in the direction of said magnetic flux, and recovering a portion of said solution containing a changed concentration of electrolyte.

3. The method for changing the distribution of ions in a solution of an electrolyte which comprises flowing an input stream of said solution through the locus of the intersection of a magnetic field and an electric field substantially transversally oriented with respect to said magnetic field, alternating the polarity of said magnetic field, synchronously alternating the polarity of said electric field, and recovering an effluent stream having a changed distribution of ions.

4. The method of claim 3 wherein the solution of electrolyte is sea water.

5. The method of claim 3 in which said effluent stream is divided into at least two streams containing unequal concentrations of electrolyte.

6. The method of claim 5 wherein the solution of an electrolyte is sea water.

7. The method for changing the distribution of an electrolyte in saline water which comprises subjecting said water to a magnetic field, concomitantly subjecting said water to an electric field intersecting and substantially transversally oriented with respect to said magnetic field, synchronously alternating the polarities of both fields, and recovering a portion of said water containing a changed concentration of electrolyte.

References Cited by the Examiner

UNITED STATES PATENTS

| 1,658,872 | 2/28 | Yeager | 204—228 |
| 1,949,660 | 3/34 | Roberts | 210—223 |
| 2,285,553 | 6/42 | Arlt . | |
| 2,842,490 | 7/58 | Friel | 204—156 |

FOREIGN PATENTS

| 401,688 | 11/33 | Great Britain. |

JOHN H. MACK, *Primary Examiner*.